(12) United States Patent
Dellock et al.

(10) Patent No.: US 9,598,632 B2
(45) Date of Patent: Mar. 21, 2017

(54) METHOD FOR DEPOSITING PHOTOLUMINESCENT MATERIAL

(71) Applicant: Ford Global Technologies, LLC, Dearborn, MI (US)

(72) Inventors: Paul Kenneth Dellock, Northville, MI (US); Stuart C. Salter, White Lake, MI (US); Cornel Lewis Gardner, Romulus, MI (US); Talat Karmo, Waterford, MI (US); Arsen Terjimanian, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/614,996

(22) Filed: Feb. 5, 2015

(65) Prior Publication Data

US 2015/0147466 A1    May 28, 2015

Related U.S. Application Data

(63) Continuation-in-part of application No. 14/086,442, filed on Nov. 21, 2013.

(51) Int. Cl.
 *C09K 11/00* (2006.01)
 *B60Q 3/00* (2006.01)

(52) U.S. Cl.
 CPC .............. *C09K 11/00* (2013.01); *B60Q 3/008* (2013.01); *C09K 2211/00* (2013.01)

(58) Field of Classification Search
 CPC .................................................... C09K 11/00
 See application file for complete search history.

(56) References Cited

U.S. PATENT DOCUMENTS

| | | | | |
|---|---|---|---|---|
| 3,984,112 A | * | 10/1976 | Marks | G11B 19/2018 369/271.1 |
| 4,313,978 A | * | 2/1982 | Stevens | D06M 13/213 252/500 |
| 4,330,387 A | * | 5/1982 | Astruc | C02F 1/46109 204/275.1 |
| 4,604,525 A | * | 8/1986 | Kitada | C09K 11/025 250/363.01 |
| 5,580,410 A | | 12/1996 | Johnston | |
| 5,709,453 A | | 1/1998 | Krent et al. | |
| 6,031,511 A | | 2/2000 | DeLuca et al. | |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Robert Vetere
(74) *Attorney, Agent, or Firm* — Jason Rogers; Price Heneveld LLP (57) ABSTRACT

A method of depositing a photoluminescent material into a surface of the polymeric material is disclosed. The method comprises dissolving the photoluminescent material in water to create a solution. The temperature of the solution is then controlled at a predetermined temperature. The surface is contacted by the solution at the predetermined temperature for a predetermined time, thereby infusing the surface with the photoluminescent material. Following the predetermined time, the solution is removed from the surface by rinsing the surface with water.

19 Claims, 3 Drawing Sheets

(56) References Cited

U.S. PATENT DOCUMENTS

| | | |
|---|---|---|
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,018,057 B2 | 3/2006 | Richard |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,302,201 B2 | 11/2007 | Park |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 * | 11/2015 | Tarahomi ............. B60Q 3/0283 |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2004/0219348 A1 * | 11/2004 | Jacquiod ............... C03C 17/007 |
| | | 428/304.4 |
| 2005/0020722 A1 * | 1/2005 | Woodhall ............... B05D 1/327 |
| | | 523/122 |
| 2006/0016109 A1 * | 1/2006 | Nicolaas ................. G09F 13/20 |
| | | 40/542 |
| 2006/0087826 A1 | 4/2006 | Anderson, Jr. |
| 2006/0093777 A1 * | 5/2006 | Handy ...................... B32B 3/02 |
| | | 428/64.1 |
| 2006/0097121 A1 | 5/2006 | Fugate |
| 2007/0032319 A1 | 2/2007 | Tufte |
| 2007/0285938 A1 | 12/2007 | Palmer et al. |
| 2009/0040611 A1 * | 2/2009 | Kitamura ........... B29D 11/0073 |
| | | 359/489.2 |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2009/0309763 A1 * | 12/2009 | Lierow .................. B60Q 3/008 |
| | | 340/981 |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0233895 A1 * | 9/2012 | Martin ................... C09K 11/02 |
| | | 40/542 |
| 2012/0280528 A1 | 11/2012 | Dellock et al. |
| 2012/0301724 A1 | 11/2012 | Frauenrath et al. |
| 2013/0283794 A1 | 10/2013 | Taillemite |
| 2013/0334546 A1 | 12/2013 | Wagenblast et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2003204085 A | 7/2003 |
| JP | 2007238063 A | 9/2007 |
| WO | 2006047306 A1 | 5/2006 |
| WO | 2014068440 A1 | 5/2014 |

* cited by examiner

METHOD FOR DEPOSITING PHOTOLUMINESCENT MATERIAL

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present invention generally relates to a method for depositing a material in a structure of a vehicle and more particularly, relates to a method for depositing a photoluminescent material in a surface of a polymeric portion of a vehicle.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a method of depositing a photoluminescent material into a surface of the polymeric material is disclosed. The method comprises dissolving the photoluminescent material in water to create a solution. The temperature of the solution is then controlled at a predetermined temperature. The surface is contacted by the solution at the predetermined temperature for a predetermined time, thereby infusing the surface with the photoluminescent material. Following the predetermined time, the solution is removed from the surface by rinsing the surface with water.

According to another aspect of the present invention, a method of depositing a photoluminescent material into a surface of the polymeric material is disclosed. The method comprises dissolving the photoluminescent material in liquid to create a solution. The temperature of the solution is then controlled at a predetermined temperature. The surface is submerged in the solution at the predetermined temperature for a predetermined time, thereby infusing the surface with the photoluminescent material. Following the predetermined time, the solution is removed from the surface by rinsing the surface with rinse liquid.

According to yet another aspect of the present invention, a method of depositing a photoluminescent material into a surface of the polymeric material is disclosed. The method comprises dissolving the photoluminescent material in fluid to create a solution. The temperature of the solution is then controlled at a predetermined temperature. The surface is submerged in the solution at the predetermined temperature for a predetermined time, thereby infusing the surface with the photoluminescent material. Following the predetermined time, the solution is removed from the surface by rinsing the surface with rinse liquid. The predetermined time decreases in response to the predetermined temperature being increased.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
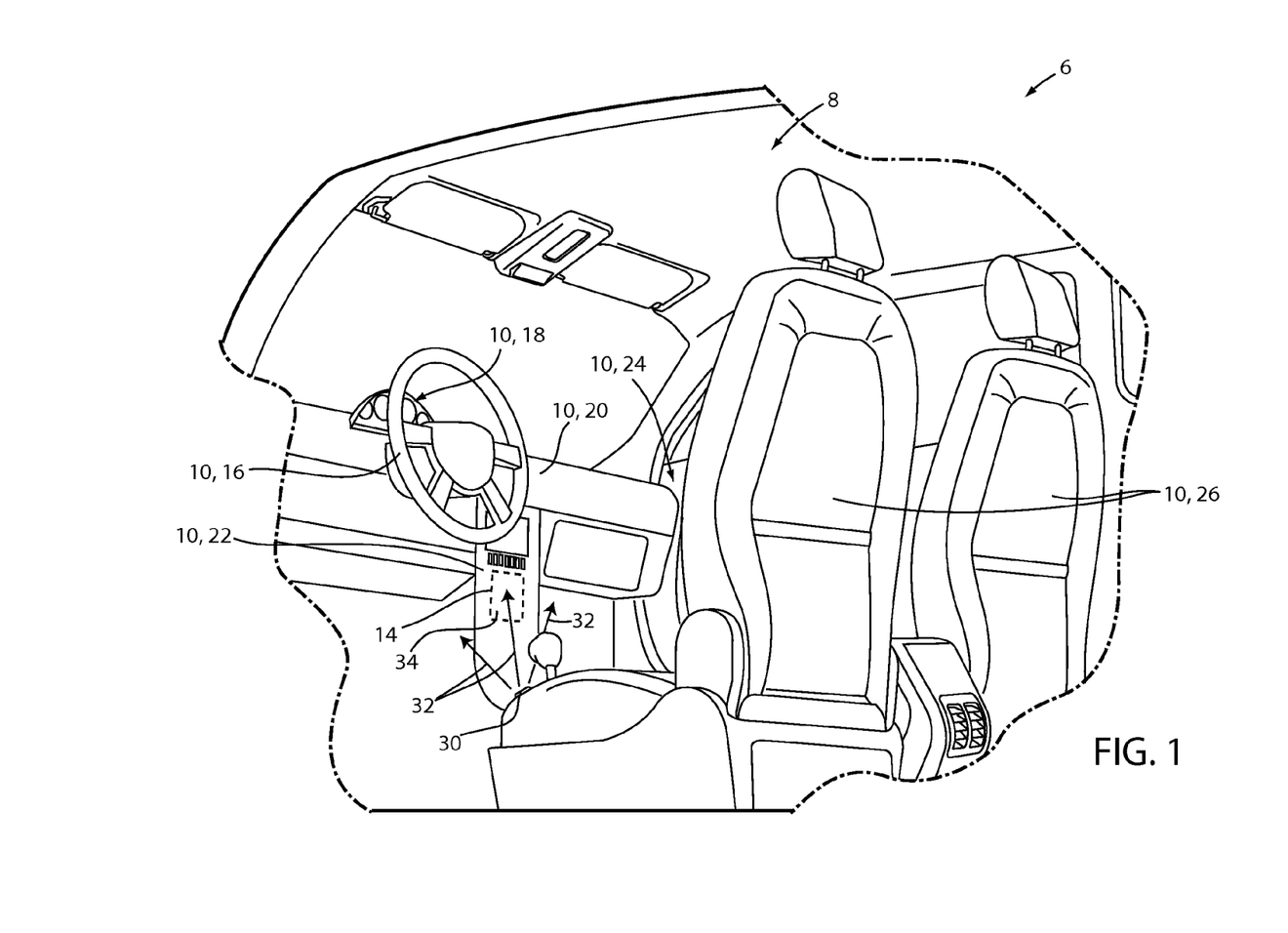
FIG. 1 is a perspective view of an interior of a vehicle demonstrating a lighting system.

Referring to FIG. 1 a perspective view of an interior of a vehicle 6 is shown demonstrating a lighting system 8. The disclosure provides for methods for depositing a photoluminescent material in a panel 10 of the vehicle 6. By depositing the photoluminescent material in at least one surface 14 of the panel 10, the panel 10 may be utilized as in the lighting system 8 to emit light from the surface containing the photoluminescent material. The method may include various steps for preparing and infusing the photoluminescent material into the at least one surface 14 of the panel 10. As described herein, the panel 10 may correspond to various interior and/or exterior panels of the vehicle 6. In some embodiments, the panel 10 may be of a polymeric material, which may be molded to various shapes and proportions and utilized for various surfaces, components, and/or devices of the vehicle 6. The various embodiments discussed herein may provide for panels that may be utilized in any portion of the vehicle 6 to illuminate the at least one surface 14 to provide attractive lighting for the vehicle 6.

As demonstrated in FIG. 1, the panel 10 may correspond to various panels and/or portions of the vehicle 6. For example, the panel 10 may correspond to at least a portion of a steering wheel 16, a gauge 18, a dashboard 20, a vehicle console 22, an interior door panel 24, a seat panel 26, and/or various other panels disposed on the vehicle 6. In an exemplary embodiment, the panel 10 may correspond to various panels of the vehicle, particularly panels formed of polymeric material. For example, the panel 10 may correspond to a molded polymeric part secured to the interior or exterior of the vehicle 6. Though particular panels and structures of the vehicle 6 are specifically discussed herein, those having ordinary skill in the art will recognize the existence of other suitable interior and/or exterior vehicle structures located throughout the vehicle 6 including various trim panels/components that may have photoluminescent materials incorporated therein as disclosed.

The panel 10 may be illuminated by a light source 30 configured to emit a first emission 32 of light. The light source 30 may be configured to emit the first emission 32 or an excitation emission at a first wavelength to excite the surface 14 of the panel 10 comprising the photoluminescent material. The surface 14 of the panel 10 comprising the photoluminescent material may be referred to as a photoluminescent portion 34. The photoluminescent portion 34 may be configured to convert the first wavelength into a second wavelength or an output emission. The first wavelength may correspond to a first color of light and the second wavelength may correspond to a second color of light, different from the first color. In various embodiments, the light source 30 may be disposed in various locations of the vehicle 6 in both back-lit and front-lit configurations as discussed in reference to FIGS. 3 and 4. While the various embodiments of the lighting system 8 described herein refer to specific structures demonstrated in reference to at least one automotive vehicle, it will be appreciated that the vehicle lighting system may be utilized in a variety of applications.

Figure 2:
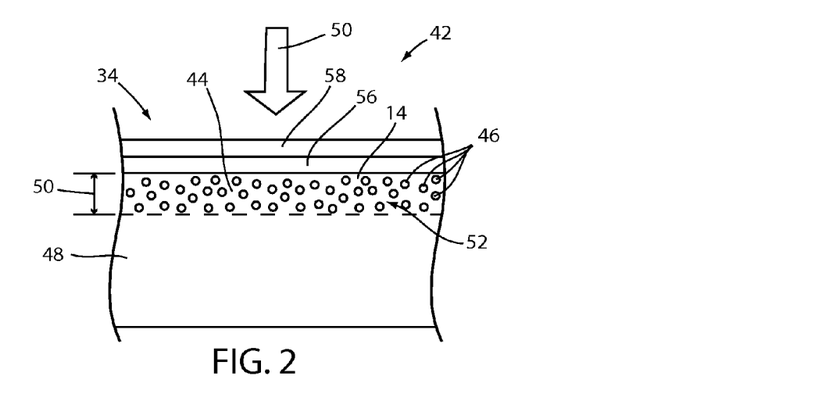
FIG. 2 is a detailed cross-sectional view of a structure of a vehicle having a photoluminescent portion deposited in a surface.
Figure 5:
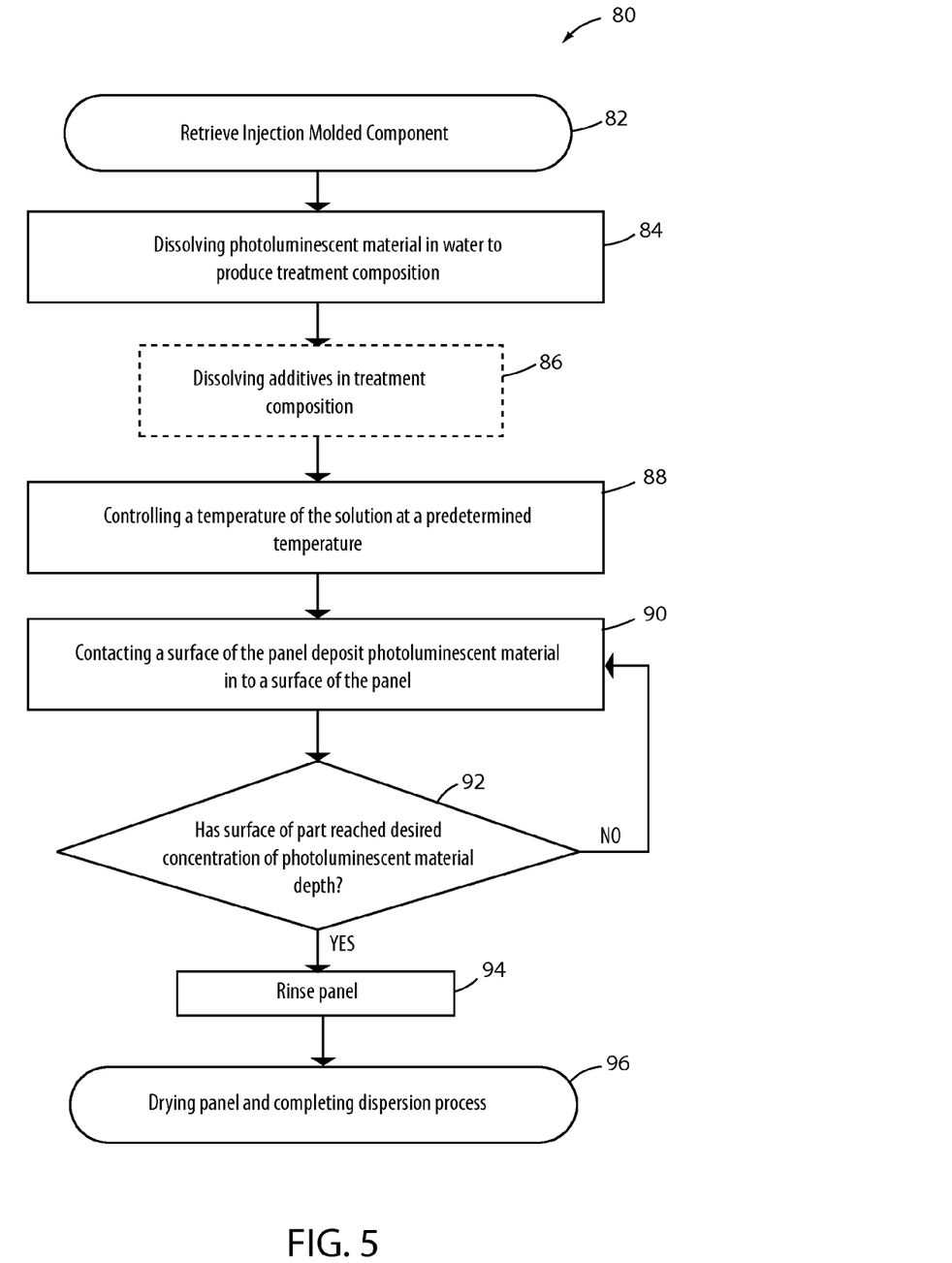
FIG. 5 is a flow chart of a method for depositing a photoluminescent material in a panel of a vehicle.

As further discussed in reference to FIGS. 2 and 5, the panel 10 may be manufactured utilizing a method for depositing a photoluminescent material in at least a portion of a surface of the panel 10. The method for depositing the photoluminescent material may include contacting at least a portion of a surface of a plastic or polymeric article (e.g. panel 10) with a treatment composition comprising a photoluminescent material dispersed in a liquid solution. In some embodiments, the photoluminescent material may be dispersed in fluid or liquid, for example water, and the plastic article may be immersed in the treatment composition for a predetermined period of time. A temperature of the treatment composition may be controlled at a predetermined temperature, which may provide for the photoluminescent material to be consistently deposited or infused into the portion of the surface of the plastic article. The disclosure provides for various methods which may be utilized to deposit photoluminescent material into various plastic articles.

Referring now FIG. 2, a cross-sectional view of a structure 42 (e.g. panel 10) of the vehicle 6 is shown demonstrating the photoluminescent portion 34 deposited in the surface 14. The structure 42 is shown having a photoluminescent material 44 disposed in the surface 14. The photoluminescent material 44 is demonstrated as a plurality of particles 46 embedded in the polymeric material 48 of the structure 42. As described herein, the structure 42 may correspond to any surface or portion of the vehicle, for example the panel 10.

The photoluminescent portion 34 may include one or more photoluminescent materials having energy converting elements selected from a phosphorescent or a fluorescent material. The photoluminescent materials may be formulated to convert an inputted electromagnetic radiation from the light source 30 into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various embodiments discussed herein, each of the wavelengths of light (e.g. the first wavelength, etc.) correspond to electromagnetic radiation utilized in the conversion process.

The structure 42 may correspond to a molded or injection molded plastic formed to suit a particular application, for example the panel 10. The photoluminescent material 44 may be deposited 50 in the surface 14 of the structure 42 by contacting at least the surface 14 with a treatment composition comprising a photoluminescent material 44 dispersed in a liquid solution. A depth 52 and concentration 54 of the photoluminescent material 44 may be controlled by the method described herein. For example, to control the depth 52 and/or the concentration 54 of the photoluminescent material 44 disposed in the surface 14, the method may provide for the surface 14 to be contacted by the treatment composition for a predetermined amount of time. Additionally, the depth 52 and/or the concentration 54 may be controlled by maintaining the treatment composition at a predetermined temperature. In this way, the disclosure provides for a method of depositing the photoluminescent material 44 in the surface 14 consistently and efficiently for various applications.

The depth 52 of the photoluminescent material 44 may ensure that the photoluminescent properties of the photoluminescent portion 34 are maintained throughout the lifetime of the structure 42. For example, by contacting the surface 14 of the structure 42 for longer durations of time, the depth of the photoluminescent material 44 may increase and provide for a higher resiliency to wear that may affect the surface 14 over time. The concentration 54 of the photoluminescent material 44 may control an intensity and/or hue of a second emission emitted from the photoluminescent portion 34 in response receiving the first emission 32 from the light source 30. By contacting the surface 14 of the structure 42 for longer durations of time, the concentration of the photoluminescent material 44 may be increased such that an intensity or hue of the color of light corresponding to the second emission may also be increased. Other variables may be controlled in the method to control the depth 52 and concentration 54 of the photoluminescent material 44, including controlling the temperature of the treatment composition and the concentration of the photoluminescent material dispersed therein.

The structure 42 may optionally include at least one stability layer 56 to protect the photoluminescent material 44 contained within the structure 42 from photolytic and thermal degradation. The stability layer 56 may be configured as a separate layer adhered to the photoluminescent portion 34 and in some embodiments may be deposited on the surface 14 similar to the photoluminescent material 44. In some embodiments, the stability layer 56 may be deposited in the surface 14, such that the stability layer 56 is integrated with the photoluminescent material 44 in the structure 42. The photoluminescent portion 34 may also comprise a protective layer 58 optically adhered to or deposited proximate the surface 14. The protective layer 58 may correspond to a variety of materials configured to protect the photoluminescent material 44 from physical and chemical damage arising from environmental exposure.

As discussed herein, the treatment composition may correspond to a water-based fluid comprising a concentration of photoluminescent material dispersed therein. The treatment composition may further comprise one or more surfactants and/or performance-enhancing additives. For example, to enhance the absorption of the photoluminescent material and/or performance-enhancing additives into the structure 42, the surfactant may be incorporated in the treatment composition. The surfactant may correspond to a variety of anionic surfactants, amphoteric surfactants, non-ionic surfactants, unsaturated fatty acids, polyphenols and/or polyalkylsubstituted phenols. Combinations of surfactants may also be incorporated in the treatment composition. Depending on the particular photoluminescent material dye utilized in the treatment composition amphoteric surfactants like lauryl sulfobetaine; dihydroxy ethylalkyl betaine may also be utilized.

Various performance-enhancing additives may also be incorporated in the treatment composition. For example, performance-enhancing additives may include at least one of UV stabilizers, optical brighteners, antistatic agents, thermal stabilizers, IR absorbers and antimicrobial agents (substances or compounds). The performance-enhancing additives may correspond to the stability layer 56 and/or the protective layer 58. Each of the stability layer 56 and the protective layer 58 may be incorporated in the treatment composition. In such embodiments, the stability layer 56 and/or the protective layer 58 may be combined in the photoluminescent portion 44 to form an integrated photoluminescent structure. Additionally, the stability layer 56 and the protective layer 58 may be dispersed in the polymeric material 48 in a separate treatment composition, and/or applied to the surface 14 of structure 42 as one or more coatings or external layers.

The photoluminescent materials as discussed herein may include rylene dyes, terrylene, quarterrylene and phosphorescent pigments, for example zinc sulfide and strontium aluminate. The photoluminescent materials may be formulated to convert an inputted electromagnetic radiation into an outputted electromagnetic radiation generally having a longer wavelength and expressing a color that is not characteristic of the inputted electromagnetic radiation. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
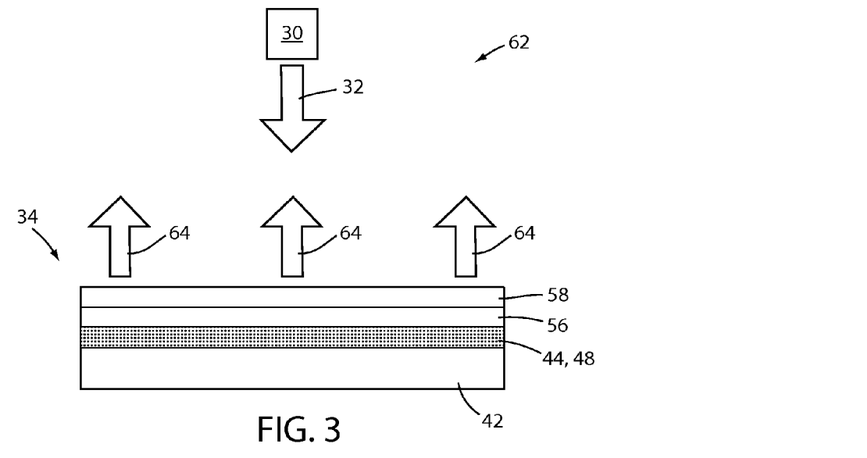
FIG. 3 is schematic view of a front-lit configuration of a lighting apparatus configured to illuminate a surface of a panel.

Referring to FIG. 3, the lighting system 8 is generally shown according to a front-lit configuration 62. In this configuration, the first emission 32 or the excitation emission is emitted from the light source 30 and is converted to a second emission 64 by the photoluminescent portion 34. The first emission 32 comprises a first wavelength $\lambda_1$, and the second emission 64 comprises at least the second wavelength. The lighting system 8 comprises the photoluminescent material 44 disposed in the photoluminescent portion 34. The photoluminescent material 44 is dispersed in the surface 14 of the structure 42 such that the structure comprises the photoluminescent portion 34 integrated into the polymeric material 48.

In some embodiments, the structure 42 may further include the stability layer 56 and/or the protective layer 58. In response to the light source 30 being activated, the first emission 32 is received by the photoluminescent material 44 and converted from the first wavelength $\lambda_1$ to the second emission 64 or the output emission having at least the second wavelength. The second emission 64 may comprise a plurality of wavelengths configured to emit any color of light from each of the photoluminescent portions discussed herein. In some embodiments, output emissions (e.g. second emission 64), generated by one or more photoluminescent portions discussed in reference to the panel 10 of the vehicle, may correspond to different colors of light. The colors of light of the output emissions may correspond to the photochemical structure of each of the photoluminescent portions. In this way, output emissions from a plurality of surfaces corresponding to photoluminescent portions may be configured to emit different colors of light in response to receiving an excitation emission.

In order to generate the plurality of wavelengths for the second emission 64, the photoluminescent material 44 may comprise one or more photoluminescent materials configured to emit the second emission 64 as a plurality of wavelengths of light in the red, green, and/or blue color spectrums. Such photoluminescent materials may further be combined to generate a wide variety of colors of light for the output emissions. For example, the red, green, and blue-emitting photoluminescent materials may be utilized in a variety of proportions and combinations to control the output color of the output emissions.

Each of the photoluminescent materials discussed herein may vary in output intensity, output wavelength, and peak absorption wavelengths based on a particular photochemical structure and combinations of photochemical structures utilized in the photoluminescent material 44. In addition to, or alternatively to the red, green, and blue-emitting photoluminescent materials, other photoluminescent materials may be utilized alone and in various combinations to generate the output emissions in a wide variety of colors. In this way, the lighting system 8 may be configured for a variety of applications to provide a desired lighting color and effect for a vehicle.

To achieve the various colors and combinations of photoluminescent materials described herein, the lighting system 8 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 9, 2013, all of which are incorporated herein by reference in their entirety.

The light source 30 may also be referred to as an excitation source and is operable to emit at least the first emission 32 or any of the excitation emissions discussed herein. The light source 30 may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emissions. The excitation emissions from the light source 30 may be configured such that the first wavelength $\lambda_1$ corresponds to at least one absorption wavelength of the one or more photoluminescent materials of the photoluminescent material 44. In response to receiving the light at the first wavelength $\lambda_1$, the photoluminescent material 44 may be excited and output the one or more output wavelengths, for example, the second emission 64 having at least the second wavelength $\lambda_2$. The first emission 32 provides an excitation source for the photoluminescent material 44 by targeting absorption wavelengths of a particular photoluminescent material or combinations thereof utilized therein. As such, the photoluminescent portion 34 may be configured to output the second emission 64 at a desired light intensity and color.

In an exemplary embodiment, the light source 30 comprises an LED configured to emit the first wavelength $\lambda_1$ which may correspond to a blue spectral, violet, and/or ultra-violet color range. The blue spectral color range comprises a range of wavelengths generally expressed as blue light (~440-500 nm). In some embodiments, the first wavelength $\lambda_1$ may comprise a wavelength in the ultraviolet and near ultraviolet color range (~100-450 nm). In an exemplary embodiment, the first wavelength $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

The first wavelength $\lambda_1$ may be approximately less than 500 nm. The blue spectral color range and shorter wavelengths may be utilized as an excitation source for the lighting system 8 due to these wavelengths having limited perceptual acuity in the visible spectrum of the human eye. By utilizing shorter wavelengths for the first wavelength $\lambda_1$, and converting the first wavelength with the photoluminescent material 44 to at least one longer wavelength, the lighting system 8 creates a visual effect of light originating from the panel 10 rather than the light source 30. In this configuration, the photoluminescent portion 34 may provide for cost effective system to provide lighting in a variety of locations.

As discussed herein, each of the plurality of wavelengths corresponding to the second emission 64 may correspond to a significantly different spectral color range. Further, each of the panel 10 of the vehicle 6 may comprise different photoluminescent materials such that each is configured to emit the second emission 64 in a different color. The second wavelength may correspond to a plurality of wavelengths configured to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions converted from the first wavelength $\lambda_1$.

Figure 4:
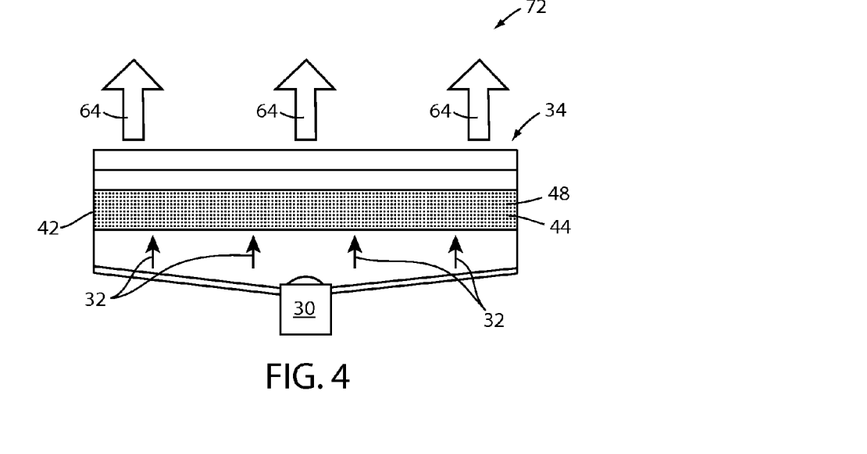
FIG. 4 is schematic view of a back-lit configuration of a lighting apparatus configured to convert a first wavelength of light to at least a second wavelength.

Referring to FIG. 4, the lighting system 8 is generally shown according to a back-lit configuration 72 to convert the first emission 32 from the light source 30 to the second emission 64. The back-lit configuration 72 comprises the photoluminescent material 44 dispersed in the polymeric material 48 of the structure 42. Similar to the photoluminescent material 44 demonstrated in reference to the front-lit configuration 62, the photoluminescent material 44 may be configured to be excited and output the one or more wavelengths corresponding to the second wavelength in response to receiving the first emission 32. In the back-lit configuration 72, the polymeric material 48 may be of at least partially transparent material such that the first emission 32 may pass through the structure 42 and be converted by the photoluminescent material 44 to emit the second emission 64.

The one or more wavelengths of the second emission 64 may be configured to emit any color of light from the photoluminescent portion 34 in response to the excitation of the photoluminescent material 44. The color of the light corresponding to the second emission 64 may be controlled by utilizing particular types and/or ratios of photoluminescent materials as discussed herein. The second emission 64 may correspond to the light output from one or more lighting devices, for example a dome light, reading light, map light, accent lighting, or any other lighting devices of the vehicle 6.

Referring now to FIG. 5, a block diagram demonstrating a method 80 for depositing photoluminescent material into the surface of the panel 10 or various structures is discussed herein. The panel 10 may correspond to a polymeric component produced by a molding process. In an exemplary embodiment, the structure 42 is molded by an injection molding process. Once the panel 10 is molded, the panel 10 may correspond to a molded plastic component which may be retrieved to begin the depositing method 80 (82). The treatment composition may be controlled and prepared for the method 80 by various steps which may include preparing the treatment composition and controlling the temperature of the treatment composition.

The treatment composition may be prepared by dissolving the photoluminescent material in a liquid or fluid, for example water (84). In addition to dissolving the photoluminescent material in the liquid, a surfactant and/or performance enhancing additives may optionally be incorporated into the treatment composition (86). The additives may include at least one of UV stabilizers, an optical brightener, antistatic agents, a thermal stabilizer, IR absorbers, and antimicrobial agents as discussed herein.

In some implementations, the treatment composition may be provided in a prepared state from a manufacturer or utilized in a treatment facility conducting the method 80 by utilizing a treatment composition in a prepared state. In order to prepare the treatment composition for depositing the photoluminescent material 44 in the surface 14, the treatment composition may be heated and maintained at a predetermined temperature (88). As discussed later, a second treatment composition may be utilized in some processes that may include materials that are incompatible with specific photoluminescent materials and/or require different processing time and/or temperature for the treatment composition.

Once the treatment composition is prepared, the surface 14 of the panel 10 may be contacted by the treatment composition such that the photoluminescent material 44, the surfactant(s), and/or the performance enhancing additives are deposited into the surface 14 of the panel 10 (90). In some embodiments, the surface 14 of the panel 10 may be monitored to determine if the surface has reached a desired concentration 54 and if the photoluminescent material 44 has reached a desired depth 52 (92). In some embodiments, a predetermined time for contacting the surface 14 of the panel 10 with the treatment composition may be applied such that each of the plurality of panels treated by the method 80 may comprise a consistent depth 52 and concentration 54 of the photoluminescent material 44.

After the predetermined time, the photoluminescent material 44 may be dispersed in the polymeric material 48 of the structure 42 corresponding to the panel 10. After the panel 10 is removed from the treatment composition, the panel 10 may be rinsed in a rinse fluid or liquid, for example a water-based solution (94). In some embodiments, an optional step 94 may include contacting the surface 14 with a second treatment composition comprising the performance enhancing additives, which may include the stability layer 56 and the protective layer 58. Contacting the surface 14 with the second treatment composition may be completed for a second predetermined period of time. Similar to the first treatment composition, the second treatment composition may be maintained at a second predetermined temperature to ensure that the stability layer 56, the protective layer 58, and/or performance enhancing additives are consistently dispersed in the polymeric material 48.

Following the contact with the second treatment composition, the panel may be rinsed in a rinsing liquid or fluid, which may correspond to a water-based solution, to remove the second treatment composition from the panel 10. The panel 10 may then be dried to complete the dispersion process (96). As such, the method 80 may be performed on various polymeric materials to produce panels and/or components having photoluminescent portions 34 disposed in their structures 42. The method 80 may be adjusted such that at least the photoluminescent material 44 may be dispersed in the surfaces of various structures corresponding to panels or components of vehicles.

Contacting the surface 14 with a treatment composition, as discussed herein, may correspond to immersing at least a portion of the panel 10 corresponding to the photoluminescent portion 34 in the treatment composition. In some embodiments, contacting the surface 14 with the treatment composition may include spraying the treatment composition on the surface 14, a curtain application of the treatment composition, a flow coating of the treatment composition, and/or a spin application of the treatment composition. As such, the method 80 may be adjusted for dispersing the photoluminescent material 44 in a variety of surfaces corresponding to various components, panels, etc.

In general, a second treatment composition or any number of treatment compositions may be prepared and utilized to infuse additional materials into the panel. Such additional materials may be applied via additional treatment compositions because they may require a different times or temperatures for contacting a treatment composition. For example, some materials may require a different time or temperature to be adequately absorbed or, in some cases, the additional materials may not be compatible with the photoluminescent material in the first treatment composition. The first treatment composition may correspond to the treatment composition prepared in step 84.

The predetermined temperatures of each of the first treatment composition and the second treatment composition may correspond to a specific composition of a polymeric material 48, a desired concentration 54 of the photoluminescent material 48, and a desired timing of the dispersion process. The predetermined temperature of each of the treatment compositions may vary based on a desired timing of the dispersion process. In some implementations, the predetermined temperature of the treatment composition may be from approximately 25° C. to approximately 99° C. In general, the predetermined temperature may be less than a boiling point of the treatment composition. In some implementations, the predetermined temperature may be from approximately 70° C. to 80° C. and, in an exemplary embodiment, the predetermined temperature may be approximately 75° C.

Each of the predetermined periods of time discussed herein corresponding to steps 90 and 94 of the method 80, may correspond to a variety of times according to a specific composition of the polymeric material 48 and a desired application of the photoluminescent portion 34. The desired timing of the dispersion process may be determined in some cases based on a desired cycle time for contacting the surface 14 with a treatment composition. In general, the predetermined time may range from approximately one second to approximately 20 minutes. In an exemplary embodiment, the predetermined time may range from approximately 10 seconds to approximately 5 minutes, and in some cases, may be from approximately 30 seconds to 3 minutes. In some embodiments the predetermined time may correspond to a time approximately greater than 30 seconds and approximately less than 1 minute. The predetermined time may be decreased in some cases as a result of increasing the predetermined temperature of a specific treatment composition.

In some embodiments, the predetermined period of time may be decreased in response to the predetermined temperature being increased. This may be due to a rate of infusion increasing at increased temperatures. Though polycarbonate is discussed in the aforementioned example, it is shall be understood that the methods described herein may be suited to adapted to infuse photoluminescent materials into various polymeric materials without departing from the spirit of the disclosure.

The following is an example of a specific process to infuse a photoluminescent material into a polymeric component. Though specific materials are discussed in the following example, it shall be understood that the example is provided for purposes of illustration and not limitation. In an exemplary embodiment, a polycarbonate component of Makrolon LED2245® was immersed in a treatment composition for approximately 58 seconds. The temperature of the treatment composition was approximately 65.5 degrees Celsius. The treatment composition may comprise a solution of water comprising rylene dye at a concentration of approximately 0.01% to 0.5% pbw (percent by weight relative to the weight of the treatment composition) as the photoluminescent material. The rylene dye may be of a mono- and/or di-imide derivative.

The percentage of the photoluminescent material may vary based on the color and intensity of the dye, and the intensity and desired color of the finished product. In some embodiments, the concentration of the photoluminescent material may vary from 0.001% to 15% pbw. The solution may also include a surfactant, as discussed herein, to improve solubility of the photoluminescent material and/or additional additives in the solution.

After treating the component with the infusion process noted above, the depth of the rylene dye was approximately 7 microns. At this depth, the component had a surface concentration of the photoluminescent material sufficient to illuminate in response to receiving an excitation emission. As previously discussed, the wavelength of the excitation emission may correspond to an absorption range of the specific photoluminescent material utilized in the treatment composition. As described herein, the methods and processes for infusing a photoluminescent material into a polymeric component may be adjusted to achieve a desired concentration and surface depth to suit a variety of applications.

The surfactants may correspond to a variety of anionic surfactants, amphoteric surfactants, non-ionic surfactants, unsaturated fatty acids, polyphenols and/or polyalkylsubstituted phenols. Combinations of surfactants may also be incorporated in the treatment composition. Depending on the particular photoluminescent material dye utilized in the treatment composition amphoteric surfactants like lauryl sulfobetaine; dihydroxy ethylalkyl betaine may also be utilized. Various performance-enhancing additives may also be incorporated in the treatment composition. For example, performance-enhancing additives may include at least one of at least one of UV stabilizers, optical brighteners, antistatic agents, thermal stabilizers, IR absorbers and antimicrobial agents (substances or compounds).

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of depositing a photoluminescent material into a surface of a molded polymeric vehicle component comprising the steps of:
    dissolving the photoluminescent material in water to create a solution;
    controlling a temperature of the solution at a predetermined temperature;
    contacting the surface with the solution, wherein:
        the contacting is maintained for a predetermined time thereby infusing the photoluminescent material into a polymeric material of the vehicle component; and
        the contacting is stopped after the photoluminescent material is embedded to a depth beneath the surface of the vehicle component; and
    rinsing the solution from the surface.

2. The method according to claim 1, wherein contacting the surface with the solution comprises submerging the molded part in the solution.

3. The method according to claim 1, wherein the predetermined temperature is approximately between 25 degrees Celsius to 100 degrees Celsius.

4. The method according to claim 1, wherein the predetermined time is approximately less than one second to approximately 20 minutes.

5. The method according to claim 1, wherein the predetermined time is approximately 30 seconds to 3 minutes.

6. The method according to claim 1, wherein the predetermined time decreases in response to the predetermined temperature being increased.

7. The method according to claim 1, wherein the solution comprises a percentage of photoluminescent material of approximately 0.001% to 15% by weight.

8. The method according to claim 1, wherein the solution comprises a percentage of photoluminescent material of approximately 0.01 to 0.5% by weight.

9. A method for infusing a molded polymeric part with a photoluminescent material comprising:
    dissolving the photoluminescent material in a fluid to create a solution;
    controlling a temperature of the solution at a predetermined temperature;
    submerging a surface of the part in the solution;
    embedding the photoluminescent material into the surface for a predetermined time until a concentration of the photoluminescent material reaches a predetermined level at a predetermined depth in the polymeric part;
    removing the polymeric part from the solution; and
    rinsing the solution from the surface with a rinse fluid.

10. The method according to claim 9, wherein the predetermined time is approximately 30 seconds to 3 minutes.

11. The method according to claim 9, wherein the photoluminescent material corresponds to at least one of a rylene or phosphor luminescent material.

12. The method according to claim 9, wherein the solution comprises a percentage of photoluminescent material of approximately 0.001 to 15% by weight.

13. The method according to claim 9, wherein the solution comprises a percentage of photoluminescent material of approximately 0.01 to 0.5% by weight.

14. The method according to claim 9, wherein the solution further comprises at least one of a surfactant and an emulsifier.

15. The method according to claim 14, wherein the surfactant comprises at least one of an anionic surfactant, an amphoteric surfactant, and a non-ionic surfactant.

16. The method according to claim 14, wherein the surfactant comprises at least one of an unsaturated fatty acid, a polyphenol and a polyalkyl substituted phenol.

17. The method according to claim 9, further comprising contacting the surface of the part with a second solution comprising at least one of a UV stabilizers, an optical brightener, an antistatic agent, a thermal stabilizer, IR absorbers, and antimicrobial agents.

18. A method of depositing a photoluminescent material into a molded polymeric vehicle part comprising the steps of:
    dissolving the photoluminescent material in liquid to create a solution;
    controlling a temperature of the solution at a predetermined temperature;
    submerging the surface in the solution;
    infusing the photoluminescent material into the surface for a predetermined time until a concentration of the photoluminescent material reaches a predetermined level at a predetermined depth in the polymeric vehicle part; and rinsing the solution from the surface with rinse liquid
   wherein the predetermined time decreases in response
   to the predetermined temperature being increased.
19. The method according to claim 18, wherein the photoluminescent material corresponds to at least one of a rylene and phosphor luminescent material.

* * * * *